Nov. 3, 1931.  W. H. LOLLEY  1,830,667
VALVE
Filed April 9, 1930  2 Sheets-Sheet 1
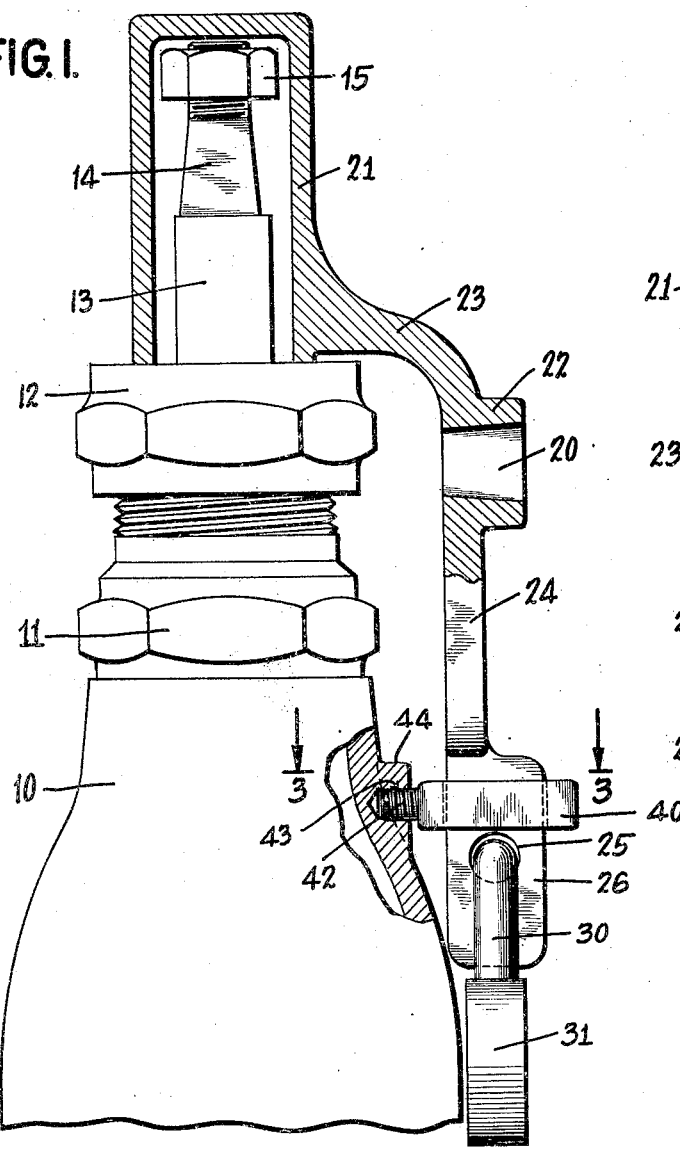
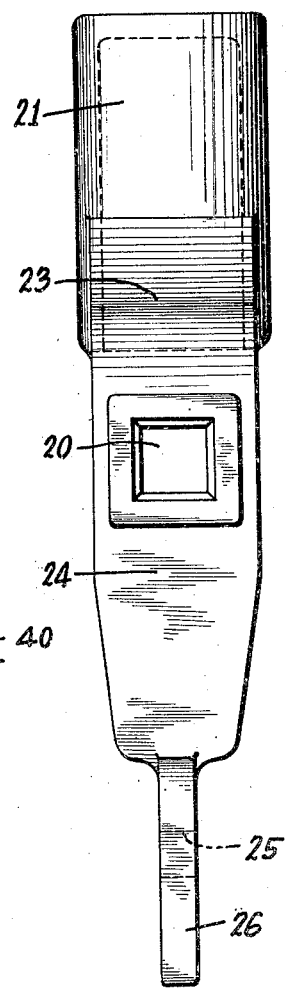
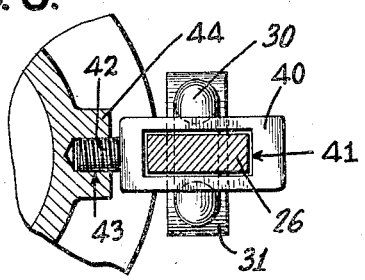
Inventor
WILLIAM H. LOLLEY
By his Attorney

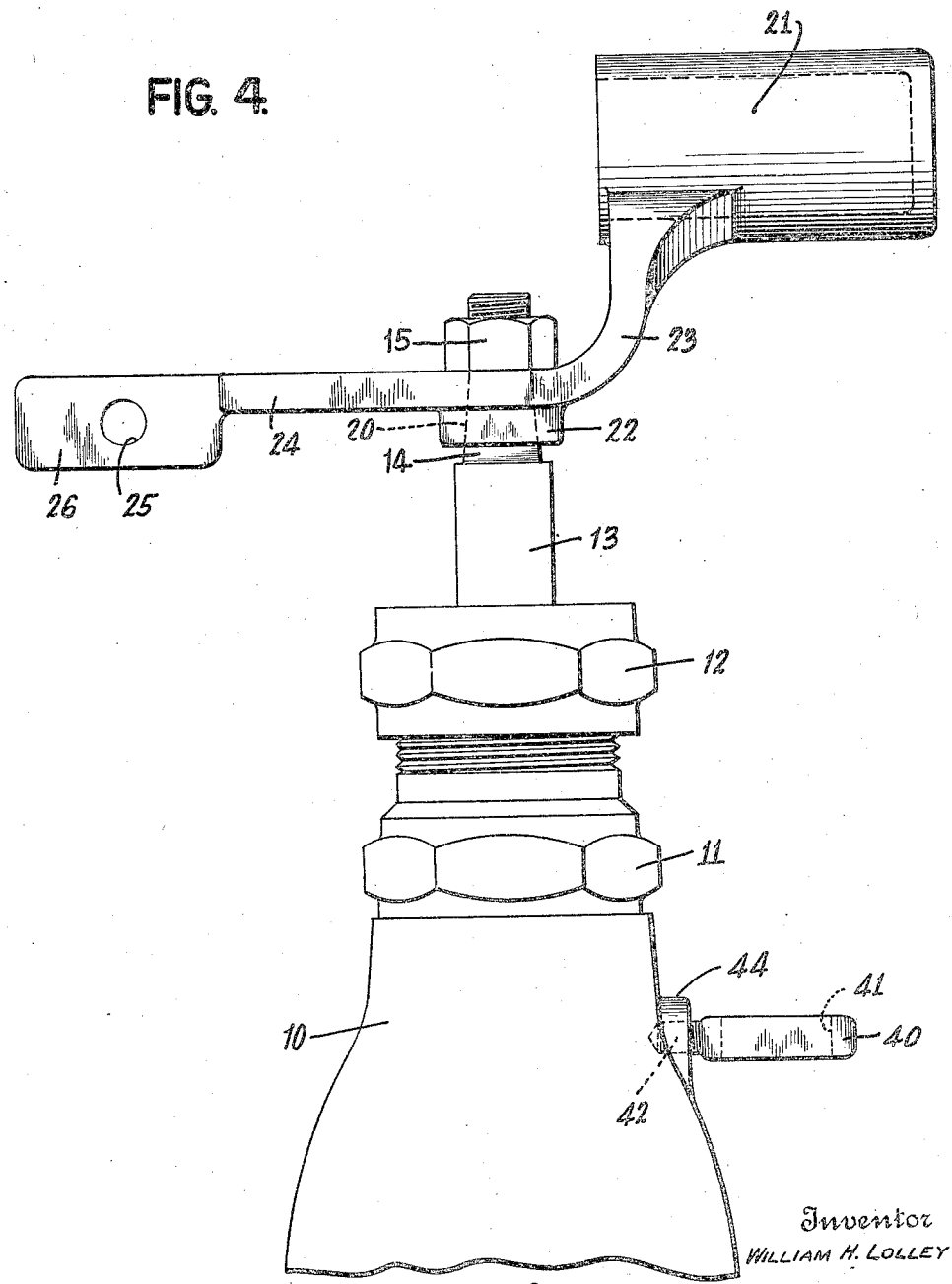

Patented Nov. 3, 1931

1,830,667

UNITED STATES PATENT OFFICE

WILLIAM H. LOLLEY, OF ALBANY, NEW YORK, ASSIGNOR TO THE LUDLOW VALVE MANUFACTURING COMPANY, OF TROY, NEW YORK, A CORPORATION OF NEW JERSEY

VALVE

Application filed April 9, 1930. Serial No. 442,758.

This invention relates to locking devices for valves and more particularly to such devices when applied to valves of the kind used in the service lines between the main in the street and the meter in a building. While the invention is applicable to valves for any fluid, liquid or gaseous, it will be described herein, for the sake of convenience, as applied to a valve in a gas line.

Heretofore, in order to prevent the fraudulent or unauthorized use of gas, for example, the gas meter has been removed and the end of the service line capped. Then, when gas was again to be furnished to the consumer, a meter was once more installed. Such removal and re-installation is expensive, both in time and labor, and, moreover, is not effective to prevent a connection being made by a dishonest consumer across the gap left by the removal of the meter, with the consequent unauthorized use of gas in unknown quantities and over which there is no control.

The present invention seeks to obviate the necessity for removal of the meter with the expense incident thereto by the provision of a valve which can be locked when closed. To this end, means are provided to prevent the opening of the valve except by an authorized person.

The invention also seeks to lock the valve in open position, if desired, and to this end the locking devices are universally applicable to the valve closing elements in all positions they assume.

It is also an object of the invention to provide a device whereby the valve cannot be tampered with. Accordingly, the valve handle is removed from operative position and so disposed as to prevent turning of the valve stem, the handle being locked against movement in its removed position.

Another object of the invention is the provision of locking devices which are equally applicable irrespective of the angular position assumed by the valve stem when the valve is seated and/or when it is open. In accordance with this aspect of the invention, a cap or enclosure for the valve stem is provided which effectively prevents access thereto and thus prevents the valve stem from being actuated.

It is also an object of the invention to prevent access to the valve stem irrespective of the length of axial movement thereof caused by the seating of the valve. To this end the locking means may, if desired, be adjustable. For instance, such means may comprise a plurality of locking positions capable of selective use, say, as the valve seats wear.

Still another object of the invention is the use of an element of the locking means as the actuating handle or wrench for the valve. Accordingly, a socket for the valve stem is carried with a handle, one portion of which forms one of cooperating locking members, while another portion of the handle serves as a valve stem engaging portion to prevent access thereto, the latter portion being conveniently so formed as to provide a convenient grip for the hand.

The invention also seeks a locking device which may be adapted to any valve construction. To this end, locking means adapted to cooperate with the handle to retain it against removal are adapted to be removably fixed to a portion of the valve but which means, when the valve handle is locked, are themselves incapable of removal or movement with respect to the valve.

A further object of the invention is the provision of a locking handle which is practical from the standpoint of ease and cheapness of manufacture and convenience and effectiveness in use. The handle or wrench for the valve stem is preferably a generally elongated member formed with a valve stem socket intermediate its ends, one of the ends of the elongated member being cup-shaped to fit over the valve stem and rest upon the stuffing box or gland while the other end of the elongated member is adapted to be received in a yoke or ring removably secured to the valve cover or bonnet, from which its removal is prevented by means, say, of a padlock passing through a hole in the end of the elongated member.

These and other objects of the invention and the means for their attainment will be more apparent from the following detailed description, taken in connection with the accompanying drawings illustrating one modification by which the invention may be realized, and in which:—

Figure 1 is a view showing the upper portion of a valve, in elevation, with the locking valve handle of this invention preventing access to the valve stem;

Figure 2 is a view, in plan, showing the locking handle looking from the right in Figure 1;

Figure 3 is a fragmentary sectional view taken in the plane indicated by the line 3—3 in Figure 1, looking in the direction of the arrows, and showing the cooperating locking features of this invention;

Figure 4 is a view similar to Figure 1 but showing the locking valve handle in place on the valve stem and in operative position to open and close the valve.

The upper part of a conventional type of valve is shown in Figures 1 and 4 whereof the cover or bonnet, indicated at 10, is provided at its top with a stuffing box 11 and a stuffing box gland or follower 12 through which the valve stem 13 extends. The invention is equally applicable to valves wherein the valve stem has an appreciable travel in an axial direction in its opening and closing movements as well as to valves in which no axial movement of the valve stem occurs in opening and closing the valve. In the valve illustrated, no appreciable travel of the valve stem occurs in opening and closing the valve. As shown, the valve stem is provided with a squared seat 14 to receive the socket 20 of an operating handle 20—25. Obviously the form taken by the valve seat, in cross section, is immaterial so long as relative movement between the seat and operating handle is prevented during use. A nut 15 is shown threaded on the end of the valve stem to secure the handle in operative position.

The operating handle for a valve of the character described takes numerous forms, such as a wheel or lever, the important aspect being that intermediate its extremities or marginal surfaces the handle is provided with a socket 20 adapted to cooperate with or engage the seat 14 on the valve stem. As shown, this socket 20 (Figure 2 above) is rectangular in outline. Also as shown, the handle takes the form of a lever or elongated member between the extremities of which the socket 20 is disposed. In order to prevent unauthorized access to the valve in either closed or open position one portion of the handle is provided with a tubular cup-shaped stem cap 21 or encasing member of a depth sufficient to telescope or fit down over the valve stem and seat upon the stuffing box gland 12. Thus the valve stem is equally protected, irrespective of the angular relation of the seat 14 to the valve. Obviously, the depth of the cap 21 may be sufficient to accommodate the valve stem whether the valve is open or closed. When in the position shown in Figure 1, it is contemplated that a part of the handle remote from the stem cap be secured against removal to some part of the valve and as such valve part is usually of a diameter greater than that of the valve stem 13 or follower 12, the stem cap 21 is conveniently carried with the operating handle in an offset relation. To this end, the main or operating arm is shown as curved upwardly from the socket portion 22 as at 23. The other extremity of the lever, illustrated, is termed, for convenience, the locking arm and has been designated by the reference numeral 24. It is provided at its extremity with one or more apertures 25 adapted to receive a lock, such as the latching yoke or shackle 30 of the padlock 31. As shown, the locking arm is flattened at its end, as at 26, to provide a more extended surface for the reception of the holes 25 and this flattened end 26 is adapted to be received in a co-operating locking member or staple member shown in detail in Figure 3. As the flattened end 26 of the locking arm is shown rectangular in cross section, the cooperating locking member is illustrated as a generally rectangular part 40 having a rectangular aperture 41 therein to receive the apertured end of the locking arm, and the locking member 40 is shown provided with a threaded pin 42 adapted to be received in a hole 43 tapped in the bonnet 10 and preferably in a lug 44 formed thereon. Obviously, the apertured end 26 may take any form in cross section, the aperture or passage 41 being made generally to conform thereto or at least to receive the apertured end. Locking member 40 is so positioned on the bonnet as to receive the cooperating locking end 26 at such a point that the aperture 25 is at the opposite side of the locking member 40 from the cap 21 and when the padlock is in place as shown in Figure 1, removal of the stem cap from the valve stem is impossible. In fact, the parts are so related that the valve handle 20—26 cannot be shifted axially of the valve stem a sufficient distance to permit the insertion of a wrench beneath the stem cap 21 to engage the stem 13 and turn it.

In Figure 4 the locking handle is shown in position on the valve stem for use as a handle or wrench to open or close the valve, being held in place by the nut 15. The stem cap may conveniently serve as a hand-grasp for the handle, it being preferably cylindrical in form and of a diameter such as to conveniently fit the hand.

It will thus be seen that an operating handle or wrench has been provided for a valve stem which can be readily removed therefrom and used to prevent unauthorized tampering with the valve. The valve may be locked in either open or closed position and the travel of the valve stem may be compensated for by properly proportioning the depth of the stem cap. The handle or wrench may be either cast, forged or otherwise made, it being obvious that the same can be drop forged in a single operation requiring thereafter only the stem cap to be hollowed out in a subsequent operation.

Various modifications will occur to those skilled in the art in the manufacture, configuration and disposition of the component elements going to make up the invention as a whole as well as in their selection and combination to accomplish any or all of the objects of the invention and no limitation is intended by the phraseology of the foregoing description or illustrations in the accompanying drawings except as indicated in the appended claim.

What is claimed is:—

A lockable encasing member for the stem of a valve having a body and a stuffing box gland for the valve stem and comprising a tubular cup-like valve stem encasing portion of such interior diameter as to be adapted to telescope loosely over the valve stem and of an interior depth at least equal to the extreme projection of the valve stem outwardly of the stuffing box gland so as to bear upon said stuffing box gland, an arm carried by the encasing portion and having its extremity extending in substantially the axial direction of the encasing portion and formed with a hole in its extremity to receive the shackle of a padlock, and a staple member carried by the valve body and so positioned as to receive the end of the arm, adjustably in the axial direction of the valve stem, at a point inwardly of the hole.

In testimony whereof I affix my signature.

WILLIAM H. LOLLEY.